(12) United States Patent
Lee et al.

(10) Patent No.: US 12,496,997 B2
(45) Date of Patent: Dec. 16, 2025

(54) SYSTEM AND METHOD FOR ADJUSTING PRESSING FEELING BY SEAT BELT

(71) Applicants: Hyundai Motor Company, Seoul (KR); Kia Corporation, Seoul (KR)

(72) Inventors: Baek Hee Lee, Suwon-si (KR); Kang Yen Lee, Seoul (KR); Soong Un Choi, Suwon-si (KR); Sang Ji Moon, Hwaseong-si (KR); Won Seok Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/644,362

(22) Filed: Apr. 24, 2024

(65) Prior Publication Data
US 2025/0196800 A1  Jun. 19, 2025

(30) Foreign Application Priority Data

Dec. 19, 2023 (KR) .................. 10-2023-0185331

(51) Int. Cl.
| | | |
|---|---|---|
| *B60R 22/12* | (2006.01) | |
| *B60R 22/19* | (2006.01) | |
| *B60R 22/20* | (2006.01) | |
| *B60R 22/34* | (2006.01) | |
| *B60R 22/44* | (2006.01) | |

(Continued)

(52) U.S. Cl.
CPC ...... *B60R 22/44* (2013.01); *B60R 2022/4473* (2013.01); *B60R 2022/4841* (2013.01); *B60R 2022/485* (2013.01)

(58) Field of Classification Search
CPC . B60R 21/01; B60R 21/015; B60R 21/01512; B60R 21/01516; B60R 21/0153; B60R 21/01538; B60R 21/01544; B60R 2021/01034; B60R 2021/0104; B60R 2021/01122; B60R 2021/01184; B60R 2021/0119; B60R 2021/01204; B60R 2021/01265; B60R 2021/01272; B60R 2021/01279; B60R 22/18; B60R 22/195; B60R 22/20; B60R 22/22; B60R 22/24; B60R 22/34; B60R 22/44; B60R 22/48; B60R 2022/207; B60R 2022/208;

(Continued)

(56) References Cited

U.S. PATENT DOCUMENTS

| | | | |
|---|---|---|---|
| 11,938,878 B1 * | 3/2024 | Jost ................. | B60R 21/01538 |
| 2004/0135359 A1 * | 7/2004 | Stanley ................. | B60R 22/18 |
| | | | 280/801.1 |

(Continued)

FOREIGN PATENT DOCUMENTS

KR  102662369 B1 * 5/2024 ............. B60R 22/34

*Primary Examiner* — Jason D Shanske
*Assistant Examiner* — Daniel M. Keck
(74) *Attorney, Agent, or Firm* — Slater Matsil, LLP

(57) ABSTRACT

In a system and a method for adjusting seat belt pressure, in which while a passenger in a vehicle is wearing a seat belt, a webbing shape and pressure applied to a passenger's body by webbing can be detected, and webbing pressure adjustment drive devices can be operated based on the detected data so that local pressure applied to the passenger's body by webbing can be reduced, thereby relieving seat belt pressure. The system can include body pressure sensors, a camera, a controller, and various webbing pressure adjustment drive devices.

20 Claims, 13 Drawing Sheets

(51) Int. Cl.
*B60R 22/48* (2006.01)
*G06V 20/59* (2022.01)

(58) Field of Classification Search
CPC .... B60R 2022/4473; B60R 2022/4808; B60R 2022/4841; B60R 2022/485
USPC .......... 280/801.1, 801.2, 802, 804, 807, 808
See application file for complete search history.

(56) References Cited

U.S. PATENT DOCUMENTS

| | | | |
|---|---|---|---|
| 2004/0215382 A1* | 10/2004 | Breed | B60R 21/01542 |
| | | | 701/45 |
| 2005/0046584 A1* | 3/2005 | Breed | B60N 2/02246 |
| | | | 340/13.31 |
| 2018/0281627 A1* | 10/2018 | Ali | B60N 2/0022 |
| 2020/0114862 A1* | 4/2020 | Jaradi | B60R 22/24 |
| 2021/0069521 A1* | 3/2021 | Lee | B60N 2/1842 |
| 2022/0128422 A1* | 4/2022 | Cech | G06V 20/593 |

* cited by examiner

SYSTEM AND METHOD FOR ADJUSTING PRESSING FEELING BY SEAT BELT

CROSS-REFERENCE TO RELATED APPLICATIONS

This application claims the benefit of Korean Patent Application No. 10-2023-0185331, filed on Dec. 19, 2023, which application is hereby incorporated herein by reference.

TECHNICAL FIELD

The present disclosure relates generally to a system and a method for adjusting seat belt pressure.

BACKGROUND

As is well known, a retractor is installed at a predetermined location on a vehicle body and is a part that pulls webbing with a predetermined tension while a predetermined length of the webbing is wound and restrains the webbing to protect a passenger in the event of a predetermined impact or more.

Generally, putting on a seat belt by a passenger in a vehicle consists of pulling webbing out of the retractor and fastening a tongue connected to the webbing to a buckle mounted on a vehicle body.

Accordingly, while a passenger is wearing a seat belt, webbing is pulled with a predetermined tension by a retractor, so seat belt pressure, that is, pressure caused by the webbing, is applied to a passenger's body.

Accordingly, the pressure caused by the webbing is the same regardless of the body size and condition of a passenger, so some passengers may not feel uncomfortable due to the pressure caused by the webbing, but other passengers may feel uncomfortable due to the pressure caused by the webbing.

Particularly, unlike general passengers, passengers who are people sensitive to upper body pressure, pregnant women, people with health problems, and people with a large belly, etc. not only have restricted movement due to pressure caused by webbing, but also feel uncomfortable due to the pressure caused by the webbing.

SUMMARY

The present disclosure relates generally to a system and a method for adjusting seat belt pressure. More particularly, the present disclosure relates to a system and a method for adjusting seat belt pressure, in which seat belt pressure can be automatically adjusted to a level desired by a passenger by considering the body size and condition of the passenger.

Accordingly, the present disclosure has been made keeping in mind the above problems occurring in the related art, and some embodiments of the present disclosure provide a system and a method for adjusting seat belt pressure, in which while a passenger in a vehicle is wearing a seat belt, a webbing shape and pressure applied to a passenger's body by webbing are detected, and webbing pressure adjustment drive devices are operated on the basis of the detected data so that seat belt pressure is relieved or automatically adjusted to a level desired by a passenger.

According to an embodiment of the present disclosure, a system for adjusting seat belt pressure can include: multiple markers attached at regular intervals on an outer surface of each of an upper webbing and a lower webbing; a body pressure sensor attached on an inner surface of each of the upper webbing and the lower webbing and configured to detect pressure applied to a passenger's body by each of the upper webbing and the lower webbing; a camera configured to photograph positions of each of the markers attached on each of the upper webbing and the lower webbing, an upper webbing pull-out guiding D-ring, a buckle, and a lower webbing fixing body; a controller configured to determine whether the body pressure at a maximum protrusion point of each of the upper webbing and the lower webbing is greater than or equal to reference pressure on a basis of a captured signal of the camera and a detection signal of the body pressure sensor; and a plurality of webbing pressure adjustment drive devices driven to relieve the body pressure to be less than the reference pressure by a control signal of the controller when the body pressure at the maximum protrusion point is greater than or equal to the reference pressure.

The controller may include: a webbing shape recognition part configured to determine a shape of each of the upper webbing and the lower webbing on the basis of the captured signal of the camera; a webbing maximum protrusion point determination part configured to determine the maximum protrusion point of each of the upper webbing and the lower webbing on a basis of the shape of each of the upper webbing and the lower webbing determined in the webbing shape recognition part; a maximum body pressure determination part configured to determine a point of maximum pressure of each of the upper webbing and the lower webbing applied to a passenger on the basis of the detection signal of the body pressure sensor; a body pressure comparison part configured to determine whether the maximum protrusion point of each of the upper webbing and the lower webbing and the maximum pressure point of each of the upper webbing and the lower webbing correspond to each other; and a driving device control part configured to command a drive control signal for relieving webbing pressure to at least one of the plurality of webbing pressure adjustment drive devices when the maximum protrusion point of each of the upper webbing and the lower webbing and the maximum pressure point of each of the upper webbing and the lower webbing correspond to each other.

The webbing shape recognition part of the controller may be configured to calculate an inclination of the markers of each of the upper webbing and the lower webbing photographed by the camera, recognize markers with inclinations greater than an inclination of 0.5 among the markers as points on the upper webbing, recognize markers with inclinations smaller than the inclination of 0.5 as points on the lower webbing, and to determine longitudinal trajectory and shape of each of the upper webbing and the lower webbing by connecting each of the points.

The webbing maximum protrusion point determination part of the controller may be configured to determine a plurality of points divided into quartiles on a longitudinal trajectory of each of the upper webbing and the lower webbing determined in the webbing shape recognition part, calculate vertical distances between the plurality of points and the camera, and determine a point of the plurality of points having a shortest vertical distance from the camera as a webbing maximum protrusion point.

The controller may be configured to re-determine the maximum protrusion point of each of the upper webbing and the lower webbing and the maximum pressure point of each of the upper webbing and the lower webbing by determining, as an error, a situation in which the maximum protrusion point of each of the upper webbing and the lower webbing and the maximum pressure point of each of the upper webbing and the lower webbing do not correspond to each other.

The plurality of webbing pressure adjustment drive devices may include: a buckle length and angle adjustment device configured to move up and down the buckle or to rotate the buckle in a width direction of a vehicle body; an upper webbing guide device configured to raise the upper webbing pulled out from the upper webbing pull-out guiding D-ring; a lower webbing position adjustment device configured to move the lower webbing fixing body up and down; and a retractor driving device configured to further pull out webbing wound inside a retractor by a predetermined length.

The buckle length and angle adjustment device may include: a hollow lifting bar connected to a lower side of the buckle; a support bar having an upper part inserted into the lifting bar and having a lower part rotatably coupled to a vehicle body; a 1-1 motor connected to a rotation shaft of the support bar; a rack formed on a side part of the lifting bar; a 1-2 motor mounted on a side of the support bar; and a pinion being connected to an output shaft of the 1-2 motor and engaged with the rack.

The upper webbing guide device may include: the upper webbing pull-out guiding D-ring mounted on a webbing entrance formed on a side panel inside a vehicle so that the upper webbing pulled out from the retractor is guided in a direction of the webbing worn by a passenger; a second motor mounted at a position under the webbing entrance; and a webbing guide connected rotatably to an output shaft of the second motor and configured to move up the upper webbing pulled out from the webbing entrance.

The lower webbing position adjustment device may include: a guide hole with a predetermined length formed in a vertical direction on a side panel inside a vehicle; the lower webbing fixing body connected to an end part of the lower webbing; an up/downward movement block extending from a rear surface part of the lower webbing fixing body and arranged movably up and down inside the guide hole; and an actuator mounted inside the side panel, wherein a plunger of the actuator is connected to a lower side of the up/downward movement block.

The retractor driving device may include: the retractor having a drum on which webbing is wound to be pulled out; and a third motor mounted on a side part of the retractor, wherein an output shaft of the third motor may be connected to a shaft of the drum.

According to an embodiment of the present disclosure, a method for adjusting seat belt pressure can include: photographing positions of multiple markers attached on each of an upper webbing and a lower webbing, the upper webbing pull-out guiding D-ring, the buckle, and the lower webbing fixing body by using the camera; detecting pressure applied to a passenger's body by each of the upper webbing and the lower webbing by the body pressure sensor attached on the inner surface of each of the upper webbing and the lower webbing; determining, by the controller, whether the body pressure at the maximum protrusion point of each of the upper webbing and the lower webbing is greater than or equal to reference pressure on a basis of a captured signal of the camera and a detection signal of the body pressure sensor; and driving at least one of a plurality of webbing pressure adjustment drive devices by a control signal of the controller so that the body pressure at the maximum protrusion point is relieved to be less than the reference pressure when the body pressure at the maximum protrusion point is greater than or equal to the reference pressure.

The controller may be configured to perform webbing shape recognition for determining longitudinal trajectory and shape of each of the upper webbing and the lower webbing on the basis of the captured signal of the camera; perform webbing maximum protrusion point determination for determining the maximum protrusion point of each of the upper webbing and the lower webbing on the basis of the longitudinal trajectory and shape of each of the upper webbing and the lower webbing determined in the webbing shape recognition; perform maximum body pressure determination for determining a point of maximum pressure of each of the upper webbing and the lower webbing applied to a passenger on the basis of the detection signal of the body pressure sensor; perform body pressure comparison for determining whether the maximum protrusion point of each of the upper webbing and the lower webbing and the maximum pressure point of each of the upper webbing and the lower webbing correspond to each other; and perform drive device control for commanding a drive control signal for relieving webbing pressure to at least one of the plurality of webbing pressure adjustment drive devices when the maximum protrusion point of each of the upper webbing and the lower webbing and the maximum pressure point of each of the upper webbing and the lower webbing correspond to each other.

In the webbing shape recognition, a process of calculating an inclination of each of the markers of each of the upper webbing and the lower webbing photographed by the camera, a process of recognizing markers with inclinations greater than an inclination of 0.5 among the markers as points on the upper webbing and recognizing markers with inclinations smaller than the inclination of 0.5 as points on the lower webbing, and a process of determining the longitudinal trajectory and shape of each of the upper webbing and the lower webbing by connecting each of the points may be sequentially performed.

In the webbing maximum protrusion point determination, a process of determining a plurality of points divided into quartiles on the longitudinal trajectory of each of the upper webbing and the lower webbing determined in the webbing shape recognition, a process of calculating vertical distances between the plurality of points and the camera, and a process of determining a point of the plurality of points having a shortest vertical distance from the camera as a webbing maximum protrusion point may be sequentially performed.

The method for adjusting seat belt pressure of the present disclosure may further include: re-determining the maximum protrusion point of each of the upper webbing and the lower webbing and a maximum pressure point of each of the upper webbing and the lower webbing by determining, as an error, a situation in which the maximum protrusion point of each of the upper webbing and the lower webbing and the maximum pressure point of each of the upper webbing and the lower webbing do not correspond to each other.

An embodiment of the present disclosure can provide the following advantages.

First, while a passenger is wearing a seat belt, a webbing shape and a body pressure applied by webbing can be detected, and the webbing pressure adjustment drive devices can be operated on the detected data, thereby can reduce seat belt pressure to remove discomfort to a passenger and improve the convenience of wearing a seat belt.

Second, a passenger can directly select one of a no-pressure mode, a loose mode, and a tight mode as a seat belt wearing mode, thereby directly adjusting seat belt pressure to a level desired by the passenger.

BRIEF DESCRIPTION OF THE DRAWINGS

The above and other features and advantages of the present disclosure can be more clearly understood from the following detailed description when taken in conjunction with the accompanying drawings, in which.

DETAILED DESCRIPTION OF ILLUSTRATIVE EMBODIMENTS

Figure 1:
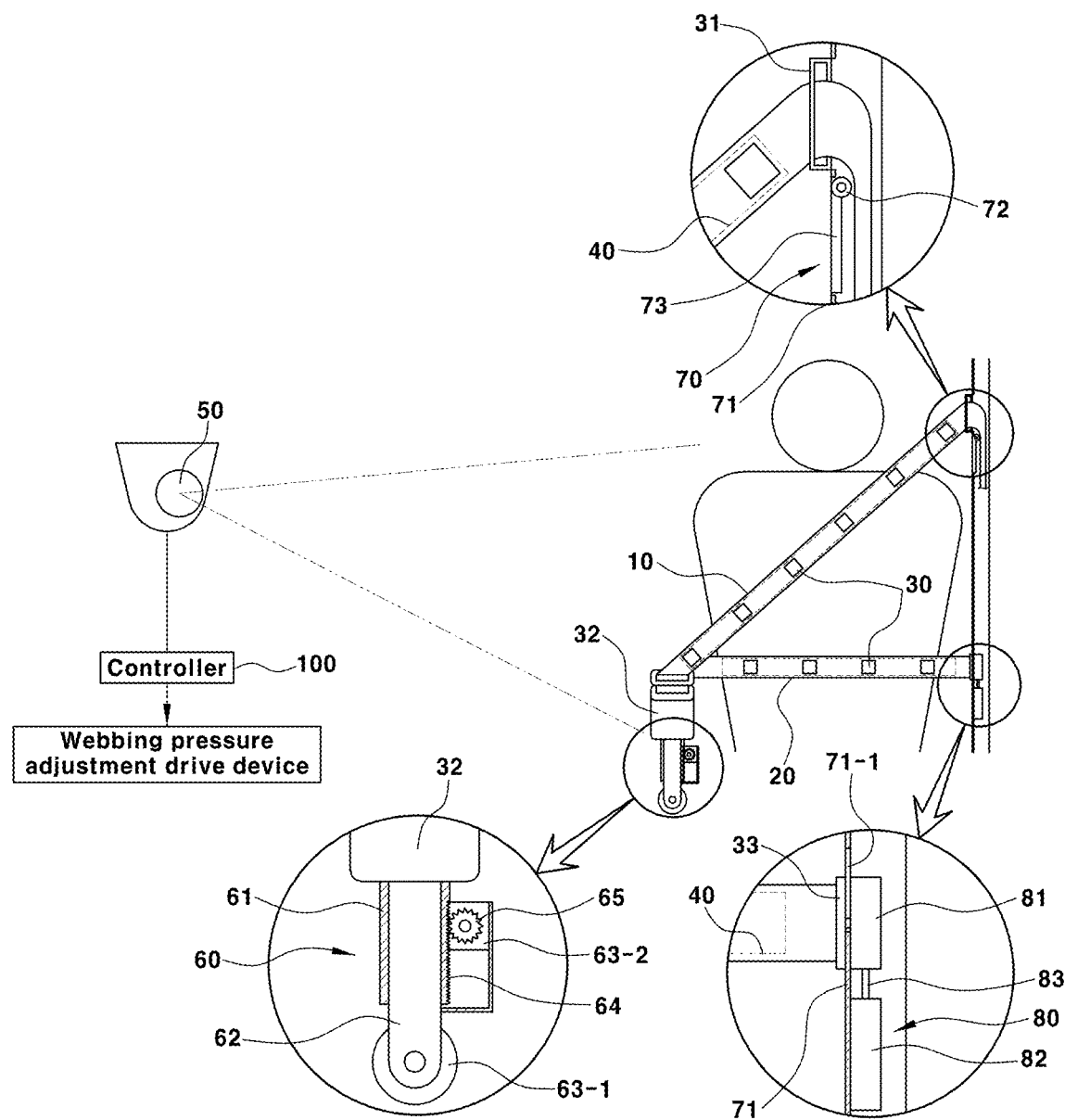
FIG. 1 is a view schematically illustrating the configuration of a system for adjusting seat belt pressure according to an embodiment of the present disclosure.

Descriptions described the present specification are intended to explain example embodiments of the present disclosure. An embodiment according to the present disclosure may be implemented in various forms, and the present disclosure should not be construed as limited by the example embodiments described in this specification, but can be understood to include all modifications, equivalents, and substitutes included in the ideas and technical scopes of the present disclosure.

In this specification, terms such as "first" and/or "second" may be used to describe various components, but the components are not necessarily limited by such terms. Such terms can be used merely for the purpose of distinguishing one component from other components. For example, without departing from the scope of the claims, a first component may be named a second component, and, similarly, the second component may be named the first component.

In this specification, when a component is referred to as being "connected" or "coupled" to another component, it can be understood that the component may be directly connected or coupled to another component, but other components may exist therebetween. On the other hand, when a component is said to be "directly connected" or "in direct contact" with another component, it can be understood that there are no other components therebetween. Other expressions to describe relationship between each component, such as "between" and "immediately between" or "adjacent to" and "directly adjacent to" can be interpreted in the same way.

Like reference numerals can refer to like elements throughout this specification. Terms used herein can be for descriptive purposes only and are not intended to necessarily limit the present disclosure. In this specification, singular forms also can include plural forms unless specifically stated in phrases. As used herein, "comprises" and/or "comprising" means that a referenced component, step, operation, and/or element do not exclude the presence or addition of one or more other components, steps, operations, and/or elements.

Hereinafter, an example embodiment of the present disclosure will be described in detail with reference to the accompanying drawings.

Figure 2:
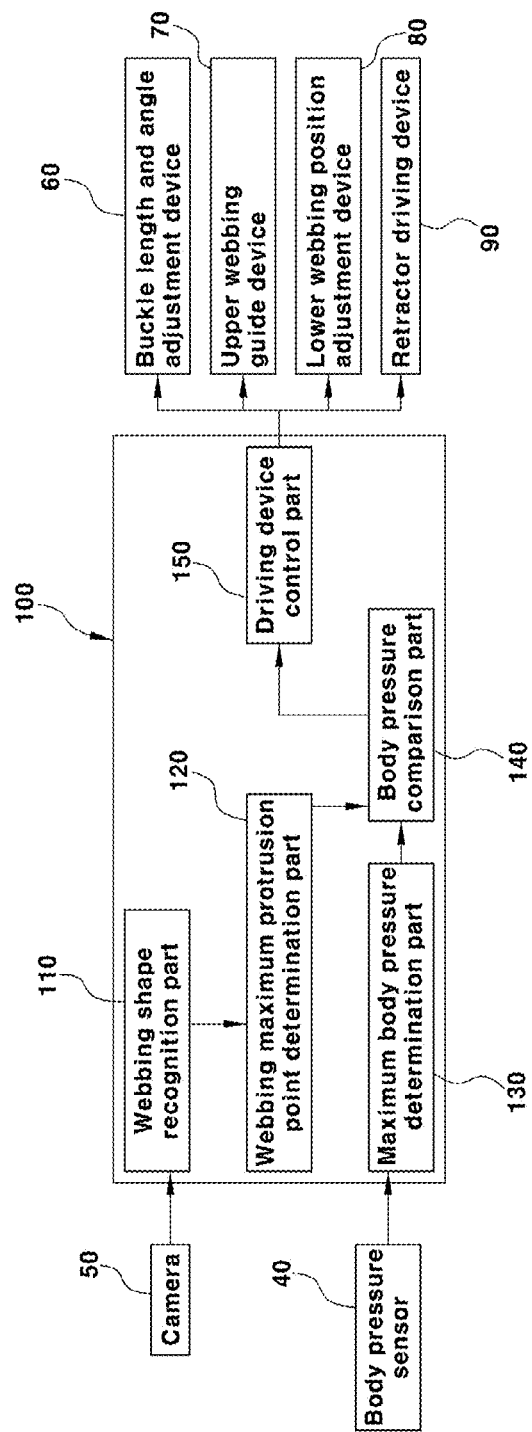
FIG. 2 is a block diagram illustrating the system for adjusting seat belt pressure according to an embodiment of the present disclosure.

FIG. 1 is a view schematically illustrating the configuration of a system for adjusting seat belt pressure according to an embodiment of the present disclosure. FIG. 2 is a block diagram illustrating the system for adjusting seat belt pressure according to an embodiment of the present disclosure.

As illustrated in FIG. 1, a seat belt can include an upper webbing 10 arranged diagonally with respect to a passenger's upper body, and a lower webbing 20 arranged left and right with respect to a passenger's abdomen, wherein multiple markers 30 are attached at regular intervals in a longitudinal direction on an outer surface of each of the upper webbing 10 and the lower webbing 20.

In addition, a body pressure sensor 40 can be attached on the inner surface of each of the upper webbing 10 and the lower webbing 20 so that the body pressure sensor detects pressure applied to the body of passenger by each of the upper webbing 10 and the lower webbing 20 and can transmit a signal of the detected body pressure to a controller 100.

The body pressure sensor 40 may include multiple body pressure sensors attached in a predetermined arrangement within a mat having a width approximately equal to the width of a webbing so as to detect the distribution of pressure applied to a passenger's body by each of the upper webbing 10 and the lower webbing 20.

In this example, while a passenger is wearing a seat belt, pressure applied to the body of the passenger by each of the upper webbing 10 and the lower webbing 20 can be understood to be the same as the pressure of each of the upper webbing 10 and the lower webbing 20 applied to the passenger, and the contact pressure of each of the upper webbing 10 and the lower webbing 20 in contact with the passenger.

In addition, a camera 50 can be mounted on a predetermined location inside a vehicle and can be configured to photograph the positions of each of the markers 30 attached on each of the upper webbing 10 and the lower webbing 20, an upper webbing pull-out guiding D-ring 31, a buckle 32, and a lower webbing fixing body 33 and to transmit captured video signals to the controller 100.

Particularly, the controller 100 can be configured to determine whether a body pressure at the maximum protrusion point of each of the upper webbing 10 and the lower webbing 20 is a reference pressure or more on the basis of captured signals of the camera 50 and detection signals of the body pressure sensor 40.

For example, while a person wears clothing, a clothing pressure, which can refer to a contact pressure applied to the body by the clothing, is usually 0.9 to 1.6 kPa, so the reference pressure may be preset to be in the range of 0.9 to 1.6 kPa.

As illustrated in FIG. 2, the controller 100 includes a webbing shape recognition part 110, a webbing maximum protrusion point determination part 120, a maximum body pressure determination part 130, a body pressure comparison part 140, and a driving device control part 150.

The webbing shape recognition part 110 of the controller 100 is configured to determine the longitudinal trajectory and shape of the upper webbing 10 and the lower webbing 20 on the basis of the captured signals of the camera 50, that is, the captured signals of the positions of each of the markers 30, the upper webbing pull-out guiding D-ring 31, the buckle 32, and the lower webbing fixing body 33.

Figure 7:
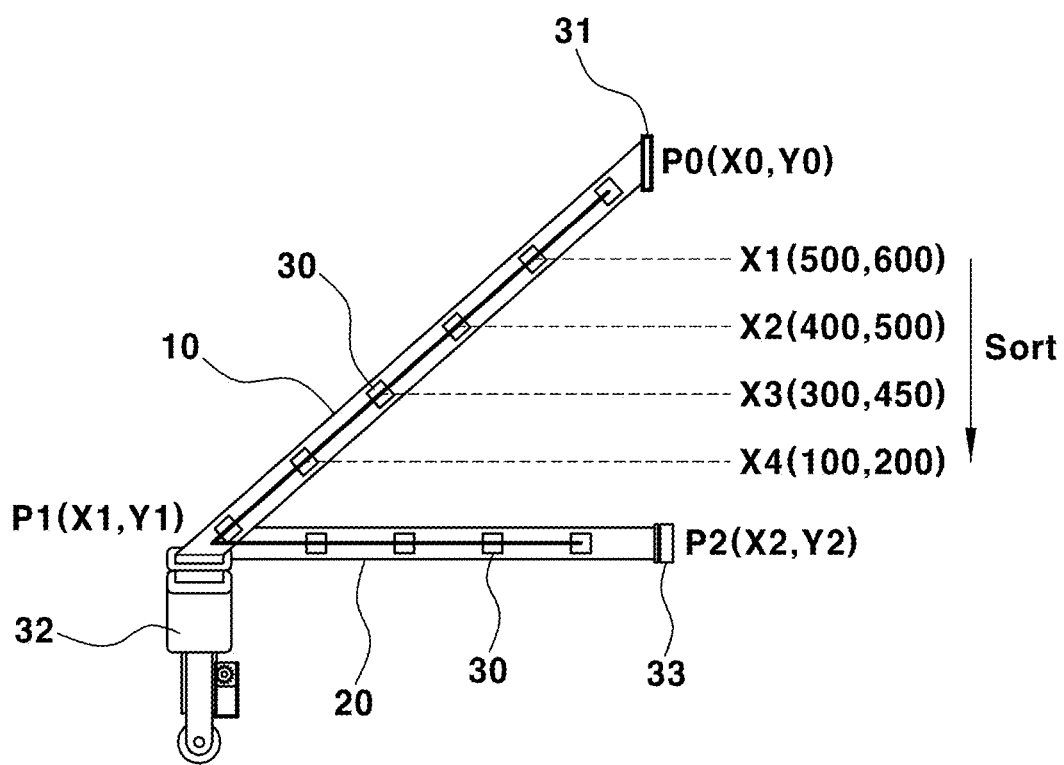
FIG. 7 is a view schematically illustrating a process of recognizing a webbing shape by a controller of the system for adjusting seat belt pressure according to an embodiment of the present disclosure.

As illustrated in FIG. 7, on the basis of the captured signals of the camera 50, the webbing shape recognition part 110 of the controller 100 is configured to recognize the location of the buckle 32 as point P1(X1,Y1) in an X/Y coordinate system, recognize the position of the upper webbing pull-out guiding D-ring 31 as point P0(X0,Y0) in the X/Y coordinate system, and recognize the location of the lower webbing fixing body 33 as point P2(X2,Y2) in the X/Y coordinate system, and then to calculate an inclination of each of the markers 30 attached to each of the upper webbing 10 and the lower webbing 20 on the basis of each of the coordinate points P1, P0, and P2.

For example, because the upper webbing 10 is arranged diagonally, an inclination of each of five markers 30 attached on the upper webbing 10 may be calculated to be in the range of 0.5 to 1.0, and because the lower webbing 20 is arranged left and right, an inclination of each of four markers 30 attached on the lower webbing 20 may be calculated to be less than 0.5.

Accordingly, the webbing shape recognition part 110 recognizes markers with inclinations greater than the inclination of 0.5 among the markers 30 as points on the upper webbing 10, and recognizes markers with inclinations less than the inclination of 0.5 among the markers 30 as points on the lower webbing 20, and then connects each of the points to determine the longitudinal trajectory and shape of each of the upper webbing 10 and the lower webbing 20.

For example, after the webbing shape recognition part 110 recognizes markers with inclinations greater than the inclination of 0.5 among the markers 30 as points on the upper webbing 10, the webbing shape recognition part 110 may sort the recognized points in a descending order from the largest Y value and may determine the longitudinal trajectory and shape of the upper webbing 10 by connecting each of the points sorted through the operation of a typical 3D program.

Likewise, after the webbing shape recognition part 110 recognizes markers with inclinations smaller than the inclination of 0.5 among the markers 30 as points on the lower webbing 20, the webbing shape recognition part 110 may sort the recognized points in an ascending order from the smallest X value and may determine the longitudinal trajectory and shape of the lower webbing 20 by connecting each of the points sorted through the operation of a typical 3D program.

The webbing maximum protrusion point determination part 120 of the controller 100 is configured to determine the maximum protrusion point (a point of a webbing protruding maximally forward while the webbing is in close contact with a surface of a passenger's body) of each of the upper webbing 10 and the lower webbing 20 on the basis of the longitudinal trajectory and shape of each of the upper webbing 10 and the lower webbing 20 determined in the webbing shape recognition part 110.

Figure 8A:
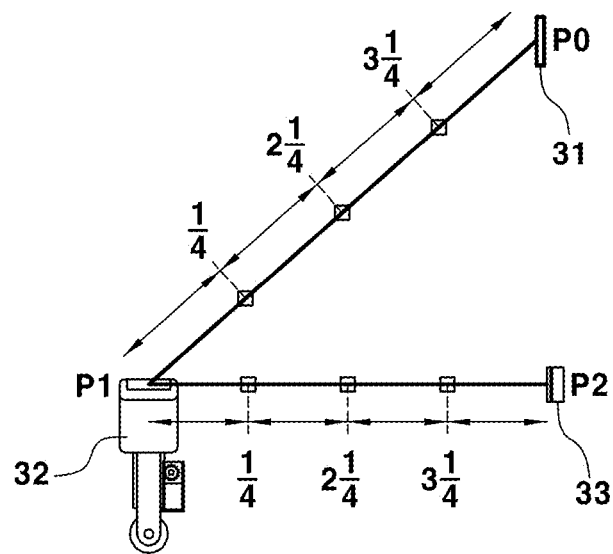
FIGS. 8A and 8B are views schematically illustrating a process of determining the maximum protrusion position of webbing by the controller of the system for adjusting seat belt pressure according to an embodiment of the present disclosure.
Figure 8B:
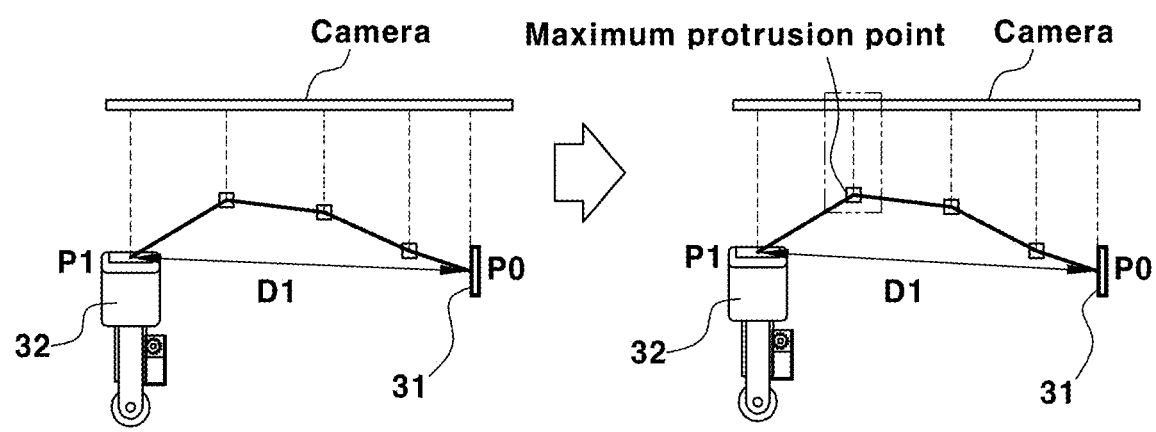

The webbing maximum protrusion point determination part 120 determines a plurality of points divided into quartiles on the longitudinal trajectory of each of the upper webbing 10 and the lower webbing 20 determined in the webbing shape recognition part 110 as illustrated in FIG. 8A, calculates vertical distances (Z values) between the plurality of points, which is divided into quartiles, and the camera 50 as illustrated in FIG. 8B, and determines a point of the plurality of points having a shortest vertical distance from the camera 50 as a webbing maximum protrusion point.

The maximum body pressure determination part 130 of the controller 100 is configured to determine a point of the maximum pressure of each of the upper webbing 10 and the lower webbing 20 applied to a passenger on the basis of the detection signals of the body pressure sensor 40.

In this case, the body pressure sensor 40 includes multiple body pressure sensors attached in a predetermined arrangement within a mat having a width approximately equal to the width of the webbing, and thus the distribution of pressure applied to a passenger's body by each of the upper webbing 10 and the lower webbing 20 may be detected. Accordingly, the maximum body pressure determination part 130 may determine a point of the maximum pressure of each of the upper webbing 10 and the lower webbing 20 applied to a passenger through the detection signals of the body pressure sensor 40.

The body pressure comparison part 140 of the controller 100 is configured to determine whether the maximum protrusion point of each of the upper webbing 10 and the lower webbing 20 determined in the webbing maximum protrusion point determination part 120 and the maximum pressure point of each of the upper webbing 10 and the lower webbing 20 determined in the maximum body pressure determination part 130 correspond to each other.

In this case, as a result of the determination of the body pressure comparison part 140, when the maximum protrusion point of each of the upper webbing 10 and the lower webbing 20 and the maximum pressure point of each of the upper webbing 10 and the lower webbing 20 do not correspond to each other, it may be determined as the error of failing to accurately determine the maximum protrusion point in the webbing maximum protrusion point determination part 120 or the error of failing to accurately determine the maximum pressure point in the maximum body pressure determination part 130.

Accordingly, when the maximum protrusion point of each of the upper webbing 10 and the lower webbing 20 and the maximum pressure point of each of the upper webbing 10 and the lower webbing 20 do not correspond to each other, the controller 100 may determine the situation as a measurement error and may re-perform the process of determining the maximum protrusion point of each of the upper webbing 10 and the lower webbing 20 and the maximum pressure point of each of the upper webbing 10 and the lower webbing 20.

As the result of the determination of the body pressure comparison part 140, when the maximum protrusion point of each of the upper webbing 10 and the lower webbing 20 and the maximum pressure point of each of the upper webbing 10 and the lower webbing 20 correspond to each other, the driving device control part 150 of the controller 100 is configured to command a drive control signal for relieving webbing pressure to at least one of a plurality of webbing pressure adjustment drive devices.

When a body pressure at the maximum protrusion point, that is, the body pressure of the maximum pressure point of each of the upper webbing 10 and the lower webbing 20 at the maximum protrusion point of each of the upper webbing 10 and the lower webbing 20 is greater than or equal to a reference pressure (e.g., pressure preset to be in a range of 0.9~1.6 kPa), the driving device control part 150 of the controller 100 commands a drive control signal for relieving webbing pressure to at least one of the plurality of webbing pressure adjustment drive devices.

Accordingly, at least one of the plurality of webbing pressure adjustment drive devices is driven to relieve a webbing pressure by the drive control signal of the driving device control part 150, so that the body pressure at the maximum protrusion point may be decreased to be less than a reference pressure to relieve the webbing pressure.

As illustrated in FIG. 2, the plurality of webbing pressure adjustment drive devices may include a buckle length and angle adjustment device 60 configured to move up and down the buckle 32 into which the tongue of a seat belt is inserted or to rotate the buckle 32 in a width direction of a vehicle body; an upper webbing guide device 70 configured to raise the upper webbing 10 pulled out from the upper webbing pull-out guiding D-ring 31; a lower webbing position adjustment device 80 configured to move the lower webbing fixing body 33 up and down; and a retractor driving device 90 configured to further pull out webbing wound inside a retractor by a predetermined length.

As illustrated in FIG. 1, the buckle length and angle adjustment device 60 may include: a hollow lifting bar 61 connected to a lower side of the buckle 32; a support bar 62 having an upper part inserted into the lifting bar 61 and having a lower part rotatably coupled to a vehicle body; a 1-1 motor 63-1 connected to a rotation shaft of the support bar 62; a rack 64 formed on a side part of the lifting bar 61; a 1-2 motor 63-2 mounted on a bracket 66 mounted on a side of the support bar 62; and a pinion 65 being connected to the output shaft of the 1-2 motor 63-2 and engaged with the rack 64.

Figure 3A:
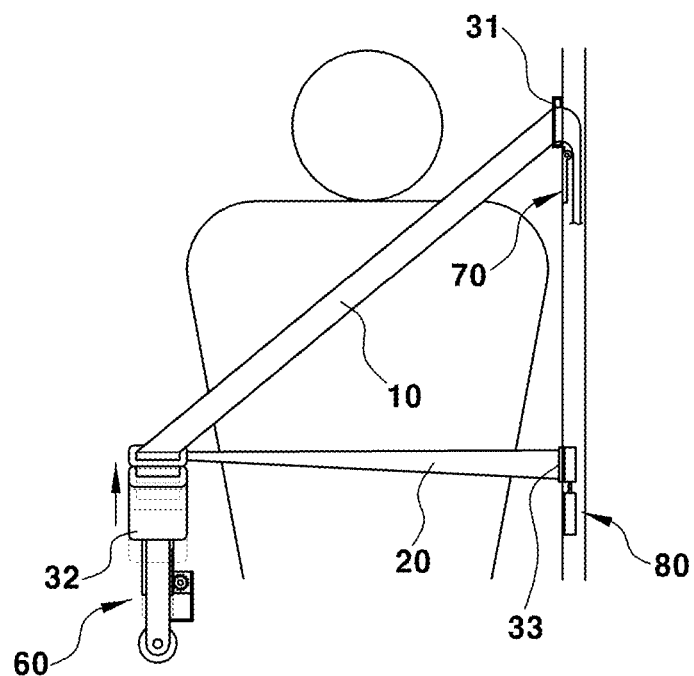
FIGS. 3A and 3B are views schematically illustrating operation states of a buckle length and angle adjustment device among webbing pressure adjustment drive devices of the system for adjusting seat belt pressure according to an embodiment of the present disclosure.
Figure 3B:
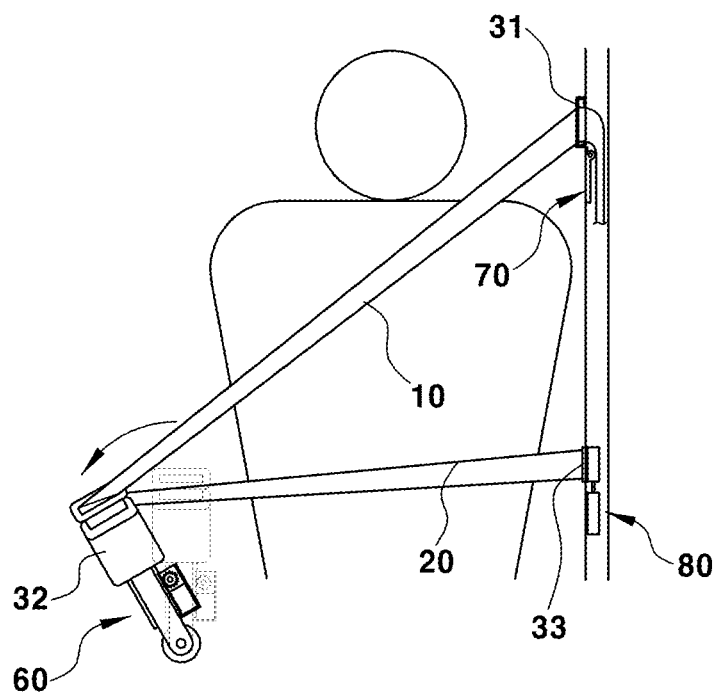

Accordingly, as illustrated in FIGS. 3A and 3B, when the 1-1 motor 63-1 is operated by the drive control signal of the driving device control part 150, the support bar 62, the lifting bar 61, and the buckle 32 may be rotated left and right, and when the 1-2 motor 63-2 operates, the rotational force of the pinion 65 may be transmitted to the rack 64 to move the lifting bar 61 and the buckle 32 up and down.

In this case, when the buckle 32 moves up or the buckle 32 rotates outward, the upper webbing 10 and the lower webbing 20 move slightly away from a passenger, and thus a body pressure at the maximum protrusion point may be reduced to be less than a reference pressure to relieve webbing pressure.

As illustrated in FIG. 1, the upper webbing guide device 70 may include: the upper webbing pull-out guiding D-ring 31 mounted on a webbing entrance formed on a side panel 71 inside a vehicle so that the upper webbing 10 pulled out from the retractor is guided in a direction of the webbing worn by a passenger; a second motor 72 mounted at a position under the webbing entrance inside the side panel 71; and a webbing guide 73 connected rotatably to the output shaft of the second motor 72 and configured to move up the upper webbing 10 pulled out through the upper webbing pull-out guiding D-ring 31.

Figure 4:
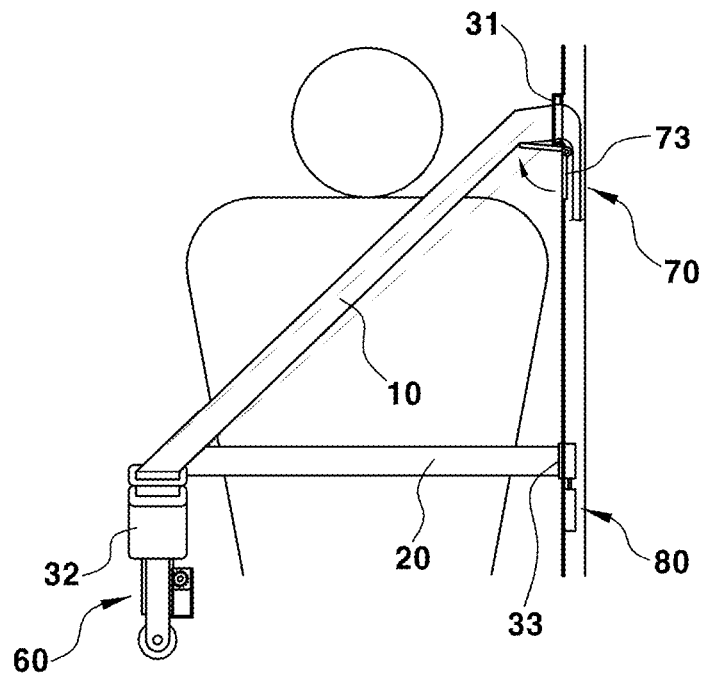
FIG. 4 is a view schematically illustrating the operation state of an upper webbing guide device among the webbing pressure adjustment drive devices of the system for adjusting seat belt pressure according to an embodiment of the present disclosure.

Accordingly, as illustrated in FIG. 4, when the second motor 72 is rotated in a first direction by the drive control signal of the driving device control part 150, the webbing guide 73 can move the upper webbing 10 upward while rotating upward, and when the second motor 72 is rotated, the webbing guide 73 can be rotated downward, and the upper webbing 10 can sag downward due to weight thereof.

In this example, when the webbing guide 73 moves the upper webbing 10 upward, the upper webbing 10 moves slightly away from a passenger, and thus a body pressure at the maximum protrusion point may be reduced to be less than a reference pressure to relieve webbing pressure.

As illustrated in FIG. 1, the lower webbing position adjustment device 80 may include: the lower webbing fixing body 33 connected to an end part of the lower webbing 20; a guide hole 71-1 with a predetermined length formed in a vertical direction on the side panel 71 inside a vehicle; an up/downward movement block 81 extending from a rear surface part of the lower webbing fixing body 33 and arranged movably up and down inside the guide hole 71-1; and an actuator 82 mounted inside the side panel 71, wherein a plunger 83 of the actuator 82 is connected to the lower side of the up/downward movement block 81.

Figure 5:
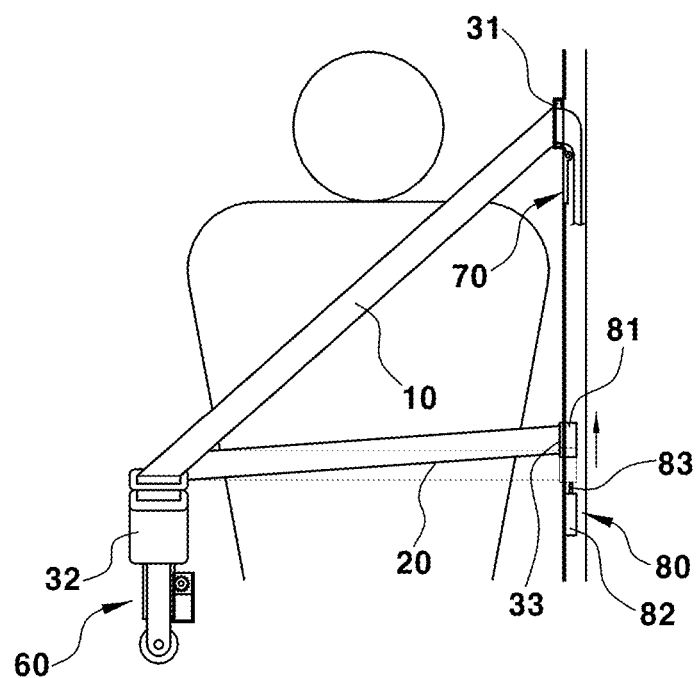
FIG. 5 is a view schematically illustrating the operation state of a lower webbing position adjustment device among the webbing pressure adjustment drive devices of the system for adjusting seat belt pressure according to an embodiment of the present disclosure.

Accordingly, as illustrated in FIG. 5, when the plunger 83 of the actuator 82 moves forward and rearward due to the drive control signal of the driving device control part 150, the up/downward movement block 81 moves up and down and at the same time, the lower webbing fixing body 33 connected to the up/downward movement block 81 moves up and down, and thus an end part of the lower webbing 20 connected to the lower webbing fixing body 33 may move up and down.

In this example, when the lower webbing fixing body 33 moves upward or downward, the lower webbing 20 moves away from the maximum protrusion point of a passenger, so a body pressure at the maximum protrusion point may be relieved to relieve webbing pressure.

Figure 6:
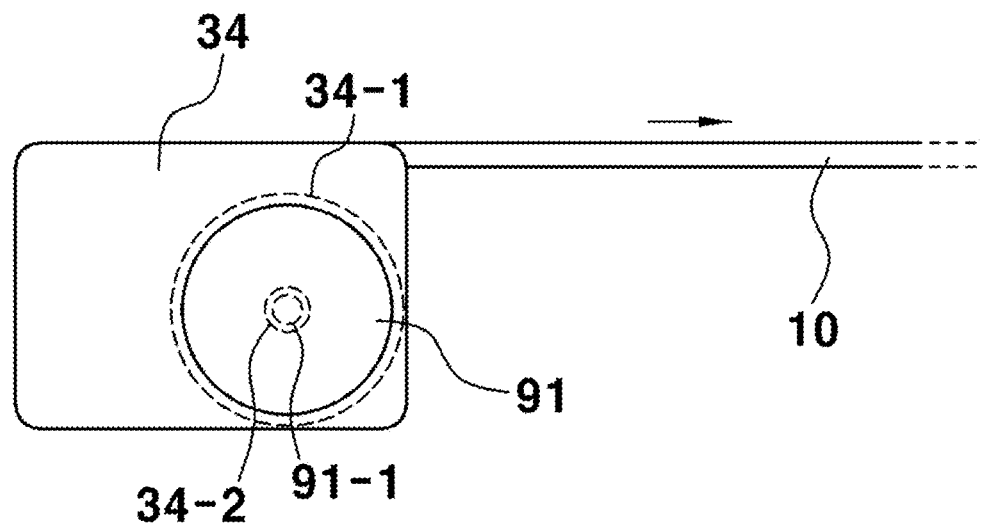
FIG. 6 is a view schematically illustrating the operation state of a retractor driving device among the webbing pressure adjustment drive devices of the system for adjusting seat belt pressure according to an embodiment of the present disclosure.

As illustrated in FIG. 6, the retractor driving device 90 can include the retractor 34 having a drum 34-1 on which the upper webbing 10 is wound to be pulled out, and a third motor 91 mounted on a side part of the retractor 34, wherein the output shaft 91-1 of the third motor 91 can be connected to a shaft 34-2 of the drum 34-1 inside the retractor 34.

Accordingly, when the third motor 91 is driven at a predetermined speed by the drive control signal of the driving device control part 150, the drum in the retractor 34 connected to the output shaft of the third motor 91 is rotated, and at the same time, the upper webbing 10 wound on the drum may be further pulled out by a predetermined length. As the length of the upper webbing 10 pulled increases, webbing pressure may be relieved.

Here, a method for adjusting seat belt pressure of an embodiment of the present disclosure having the above configuration will be described.

First, while a passenger in a vehicle is wearing a seat belt, the positions of multiple markers 30 attached on the upper webbing 10 and the lower webbing 20, the upper webbing pull-out guiding D-ring 31, the buckle 32, and the lower webbing fixing body 33 can be photographed by the camera 50.

In addition, while a passenger is wearing a seat belt, pressure applied to the body of the passenger by each of the upper webbing 10 and the lower webbing 20 can be detected by the body pressure sensor 40 attached on the inner surface of each of the upper webbing 10 and the lower webbing 20.

Accordingly, on the basis of the captured signal of the camera 50 and the detection signal of the body pressure sensor 40, whether a body pressure at the maximum protrusion point of each of the upper webbing 10 and the lower webbing 20 is a reference pressure or more can be determined by the controller 100.

The controller 100 can sequentially perform the following: webbing shape recognition for determining the longitudinal trajectory and shape of each of the upper webbing 10 and the lower webbing 20 on the basis of the captured signals of the camera 50; webbing maximum protrusion point determination for determining the maximum protrusion point of each of the upper webbing 10 and the lower webbing 20 on the basis of the shape of each of the upper webbing 10 and the lower webbing 20 determined in the webbing shape recognition; maximum body pressure determination for determining the maximum pressure point of each of the upper webbing 10 and the lower webbing 20 applied to a passenger on the basis of the detection signal of the body pressure sensor; body pressure comparison for determining whether the maximum protrusion point and the maximum pressure point of each of the upper webbing 10 and the lower webbing 20 correspond to each other; and drive device control for commanding a drive control signal for relieving webbing pressure to at least one of the plurality of webbing pressure adjustment drive devices when the maximum protrusion point and the maximum pressure point of each of the upper webbing and the lower webbing correspond to each other.

In the webbing shape recognition, the process of calculating the inclination of each of the markers 30 of each of the upper webbing 10 and the lower webbing 20 photographed by the camera 50, the process of recognizing markers with inclinations greater than the inclination of 0.5 among the markers 30 as points on the upper webbing and recognizing markers with inclinations smaller than the inclination of 0.5 among the markers 30 as points on the lower webbing, and the process of determining the longitudinal trajectory and shape of each of the upper webbing 10 and the lower webbing 20 by connecting each of the points may be sequentially performed.

As described above, as illustrated in FIG. 7, after the webbing shape recognition part 110 of the controller 100 recognizes the position of the buckle 32 as point P1(X1,Y1) in the X/Y coordinate system on the basis of the captured signals of the camera 50, recognizes the position of the upper webbing pull-out guiding D-ring 31 as point P0(X0, Y0) in the X/Y coordinate system, and recognizes the position of the lower webbing fixing body 33 as point P2(X2,Y2) in the X/Y coordinate system, the webbing shape recognition part 110 can calculate the inclination of each of the markers 30 attached to the upper webbing 10 and the lower webbing 20 on the basis of the coordinate points P1, P0, and P2.

Next, after the webbing shape recognition part 110 recognizes markers with inclinations greater than the inclination of 0.5 among the markers 30 as points on the upper webbing 10 and recognizes markers with inclinations smaller than the inclination of 0.5 among the markers 30 as points on the lower webbing 20, the webbing shape recognition part 110 can determine the longitudinal trajectory and shape of each of the upper webbing 10 and the lower webbing 20 by connecting each of the points.

For example, after the webbing shape recognition part 110 recognizes markers with inclinations greater than the inclination of 0.5 among the markers 30 as points on the upper webbing 10, the webbing shape recognition part 110 may sort the recognized points in the descending order from the largest Y value, and then may determine the longitudinal trajectory and shape of the upper webbing 10 by connecting each of the points sorted through the operation of a typical 3D program.

Likewise, after the webbing shape recognition part 110 recognizes with markers inclinations smaller than the inclination of 0.5 among the markers 30 as points on the lower webbing 20, the webbing shape recognition part 110 may sort the recognized points in the ascending order from the smallest X value, and then may determine the longitudinal trajectory and shape of the lower webbing 20 by connecting each of the points sorted through the operation of a typical 3D program.

In the webbing maximum protrusion point determination, a process of determining a plurality of points divided into quartiles on the longitudinal trajectory of each of the upper webbing 10 and the lower webbing 20 determined in the webbing shape recognition, a process of calculating vertical distances between the plurality of points and the camera 50, and a process of determining a point of the plurality of points having a shortest vertical distance from the camera as a webbing maximum protrusion point may be sequentially performed.

The webbing maximum protrusion point determination part 120 described above can determine a plurality of points divided into quartiles on a longitudinal trajectory of each of the upper webbing 10 and the lower webbing 20 determined in the webbing shape recognition part 110 as illustrated in FIG. 8A, calculate the vertical distance (Z value) between the plurality of points, which is divided into quartiles, and the camera 50 as illustrated in FIG. 8B, and determine a point of the plurality of points having the shortest vertical distance from the camera 50 as a webbing maximum protrusion point.

In this example, when the maximum protrusion point of each of the upper webbing 10 and the lower webbing 20 and the maximum pressure point of each of the upper webbing 10 and the lower webbing 20 do not correspond to each other, the controller 100 can determine the situation as a measurement error and re-performs the process of determining the maximum protrusion point of each of the upper webbing 10 and the lower webbing 20 and the maximum pressure point of each of the upper webbing 10 and the lower webbing 20.

Next, when the body pressure at the maximum protrusion point is the reference pressure or more, at least one of the plurality of webbing pressure adjustment drive devices can be operated by the control signal of the controller so that the body pressure can be relieved to be less than the reference pressure.

Figure 9:
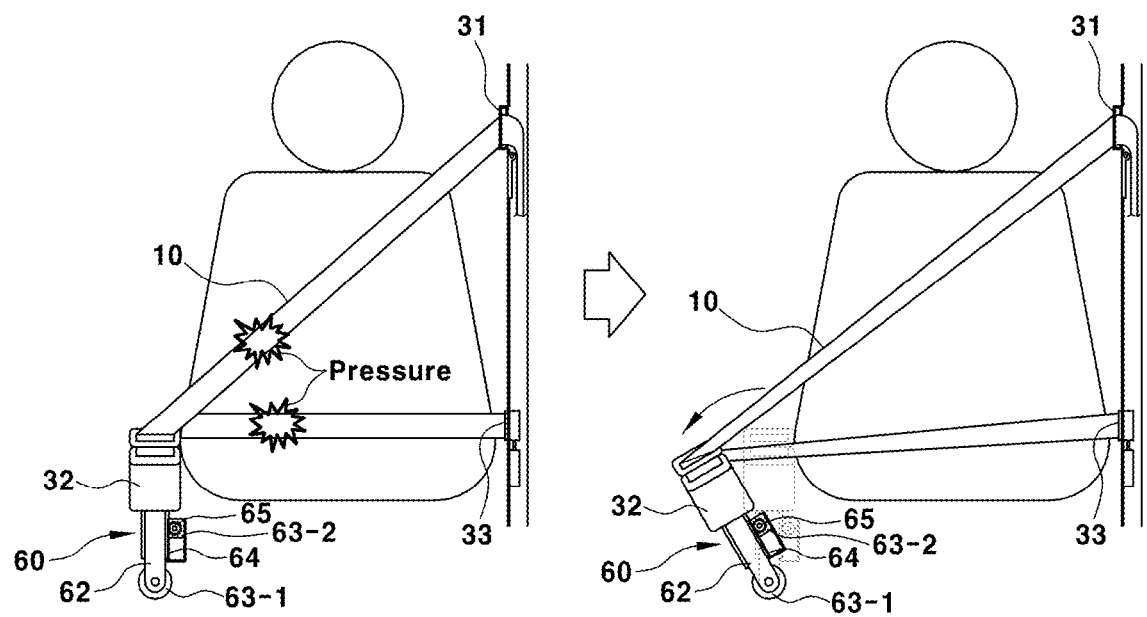
FIG. 9 is a view schematically illustrating an example of relieving webbing pressure by adjusting the angle of a buckle by the system for adjusting seat belt pressure according to an embodiment of the present disclosure.

FIG. 9 is a view schematically illustrating an example of relieving webbing pressure by adjusting the angle of the buckle by the system for adjusting seat belt pressure according to an embodiment of the present disclosure.

As illustrated in FIG. 9, in an example case in which each of the lower end part of the upper webbing 10 and the inner end part of the lower webbing 20 is the maximum protrusion point and a body pressure at the maximum protrusion point is greater than or equal to a reference pressure, the buckle 32 can be rotated outward by the operation of the buckle length and angle adjustment device 60, and each of the upper webbing 10 and the lower webbing 20 can move slightly away from a passenger, so the body pressure at the maximum protrusion point can be reduced to be less than the reference pressure for relieving webbing pressure, and accordingly, the webbing pressure can be relieved.

Figure 10A:
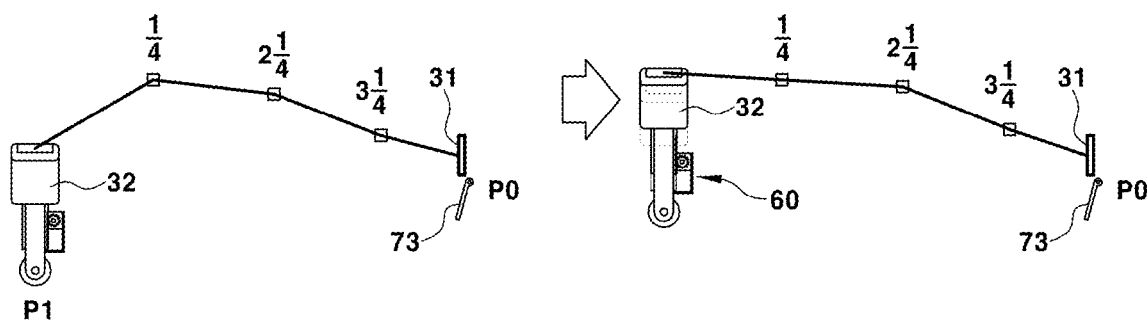
FIGS. 10A, 10B, and 10C are views schematically illustrating examples of relieving webbing pressure by adjusting the length of the buckle and the angle of an upper webbing pull-out guiding D-ring by the system for adjusting seat belt pressure according to an embodiment of the present disclosure.
Figure 10B:
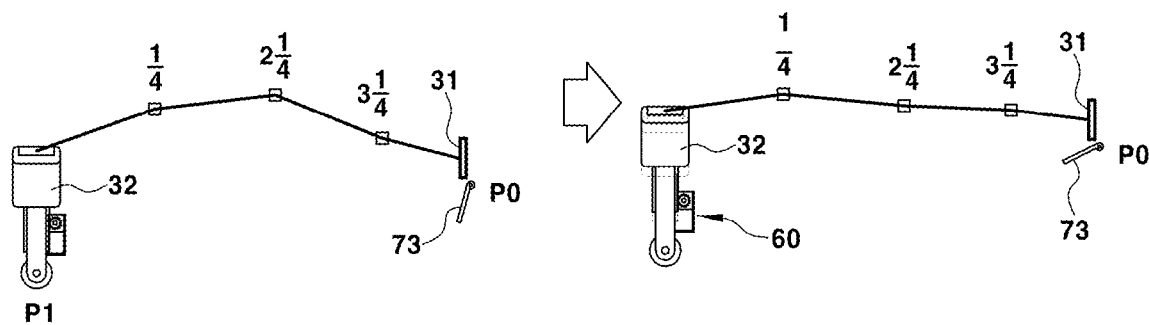
Figure 10C:
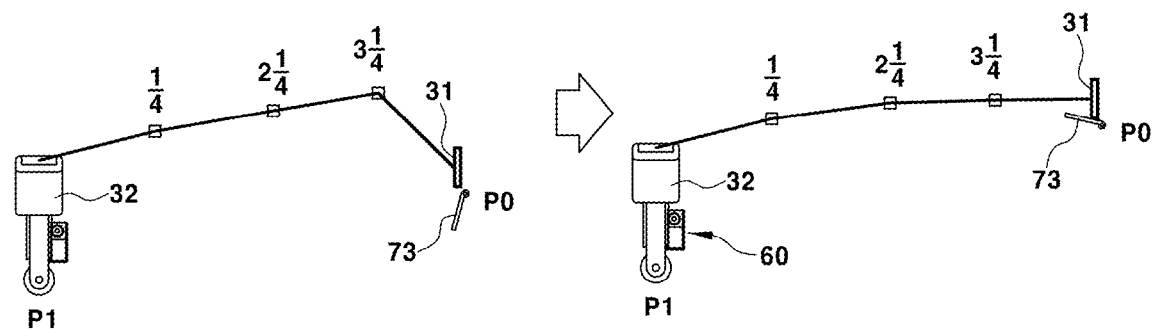

FIGS. 10A, 10B, and 10C are views schematically illustrating examples of relieving webbing pressure by adjusting the length of the buckle and the angle of the upper webbing pull-out guiding D-ring by the system for adjusting seat belt pressure according to an embodiment of the present disclosure.

As illustrated in FIGS. 10A, 10B, and 10C, due to the operation of the buckle length and angle adjustment device 60 according to the maximum protrusion point of the lower end part of the upper webbing 10 and the inner end part of the lower webbing 20, the rising length of the buckle 32 can be adjusted and the rotation angle of the upper webbing 10 can be raised by the webbing guide 73 of the upper webbing guide device 70 and can be adjusted, and thus the upper webbing 10 can move slightly away from a passenger. Accordingly, a body pressure at the maximum protrusion point can be reduced to be less than a reference pressure to relieve a webbing pressure, and thus the webbing pressure can be relieved.

Figure 11:
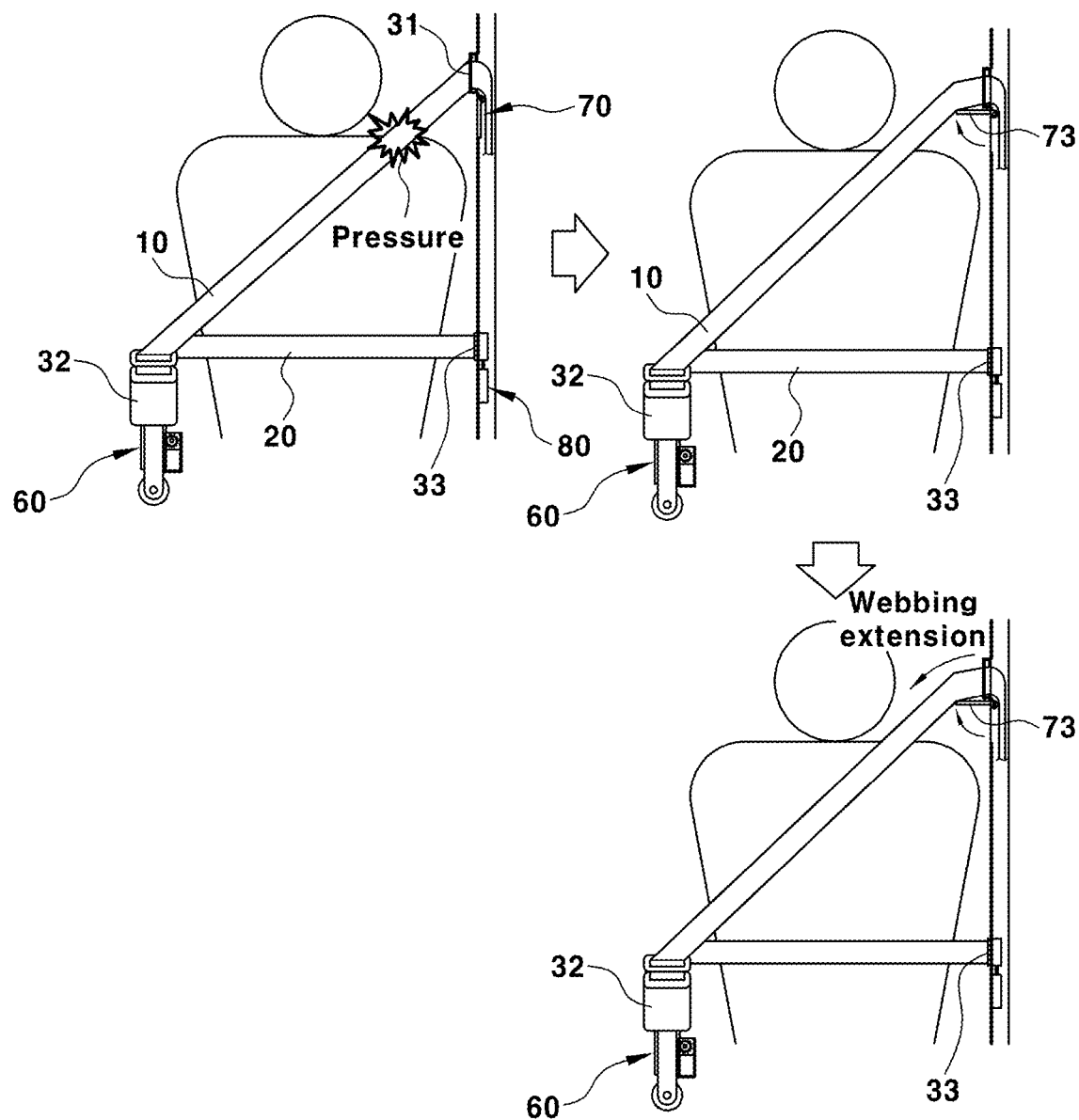
FIG. 11 is a view schematically illustrating one example of relieving webbing pressure by the system for adjusting seat belt pressure according to an embodiment of the present disclosure.

FIG. 11 is a view schematically illustrating an example of relieving webbing pressure by the system for adjusting seat belt pressure according to an embodiment of the present disclosure.

As illustrated in FIG. 11, when an excessive webbing pressure is applied to the top of a passenger's shoulder, the webbing guide 73 of the upper webbing guide device 70 can rotate to raise the upper webbing 10, and the upper webbing 10 can move slightly away from the passenger, so the webbing pressure may be relieved.

Nevertheless, the webbing pressure on the top of the passenger's shoulder may not be relieved. Accordingly, due to the drive control signal of the driving device control part 150, a drum inside the retractor 34 connected to the output shaft of the third motor 91 can be rotated, and at the same time, the upper webbing 10 wound on the drum can be further pulled out by a predetermined of length, so the webbing pressure can be relieved.

Figure 12:
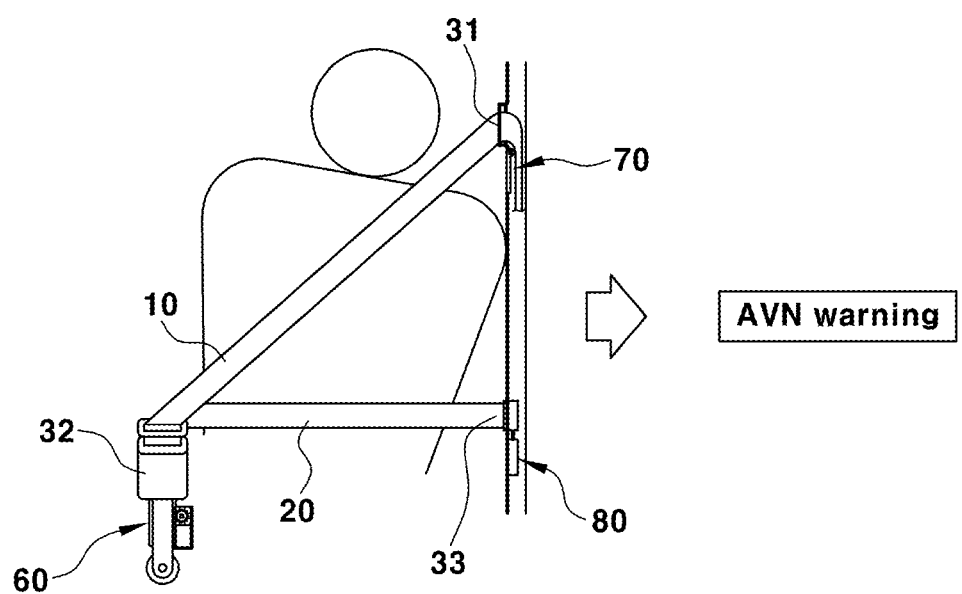
FIG. 12 is a view schematically illustrating an example of misrecognition for relieving webbing pressure by the system for adjusting seat belt pressure according to an embodiment of the present disclosure.

FIG. 12 is a view schematically illustrating an example of misrecognition for relieving webbing pressure by the system for adjusting seat belt pressure according to an embodiment of the present disclosure.

As described above, when the maximum protrusion point of each of the upper webbing 10 and the lower webbing 20 and the maximum pressure point of each of the upper webbing 10 and the lower webbing 20 do not correspond to each other, it may be determined as an error of failing to accurately determine the maximum protrusion point in the webbing maximum protrusion point determination part 120 or an error of failing to accurately determine the maximum pressure point in the maximum body pressure determination part 130.

Accordingly, the process of determining the maximum protrusion point of each of the upper webbing 10 and the lower webbing 20 and the maximum pressure point of each of the upper webbing 10 and the lower webbing 20 may be performed again, but as illustrated in FIG. 12, when a passenger maintains an unstable posture by leaning his or her upper body and shoulders toward a side panel or door panel, errors may continue to occur.

Accordingly, on the basis of a signal photographed by the camera 50, when a passenger's posture remains unstable for a predetermined period of time (e.g., a posture of a passenger leaning his or her upper body and shoulders against the side panel or door panel), a warning message to correct the passenger's posture can be displayed on a display of an AVN (audio, video, and navigation) system.

Accordingly, while a passenger is wearing a seat belt, a webbing shape and a body pressure applied by webbing can be detected, and the webbing pressure adjustment drive devices can be operated on the basis of the detected data, so a passenger's discomfort can be relieved through the decreasing of seat belt pressure, and accordingly, the convenience of wearing a seat belt can be improved.

Here, an operation example of the system for adjusting seat belt pressure according to an embodiment of the present disclosure according to a user's setting will be described.

Figure 13:
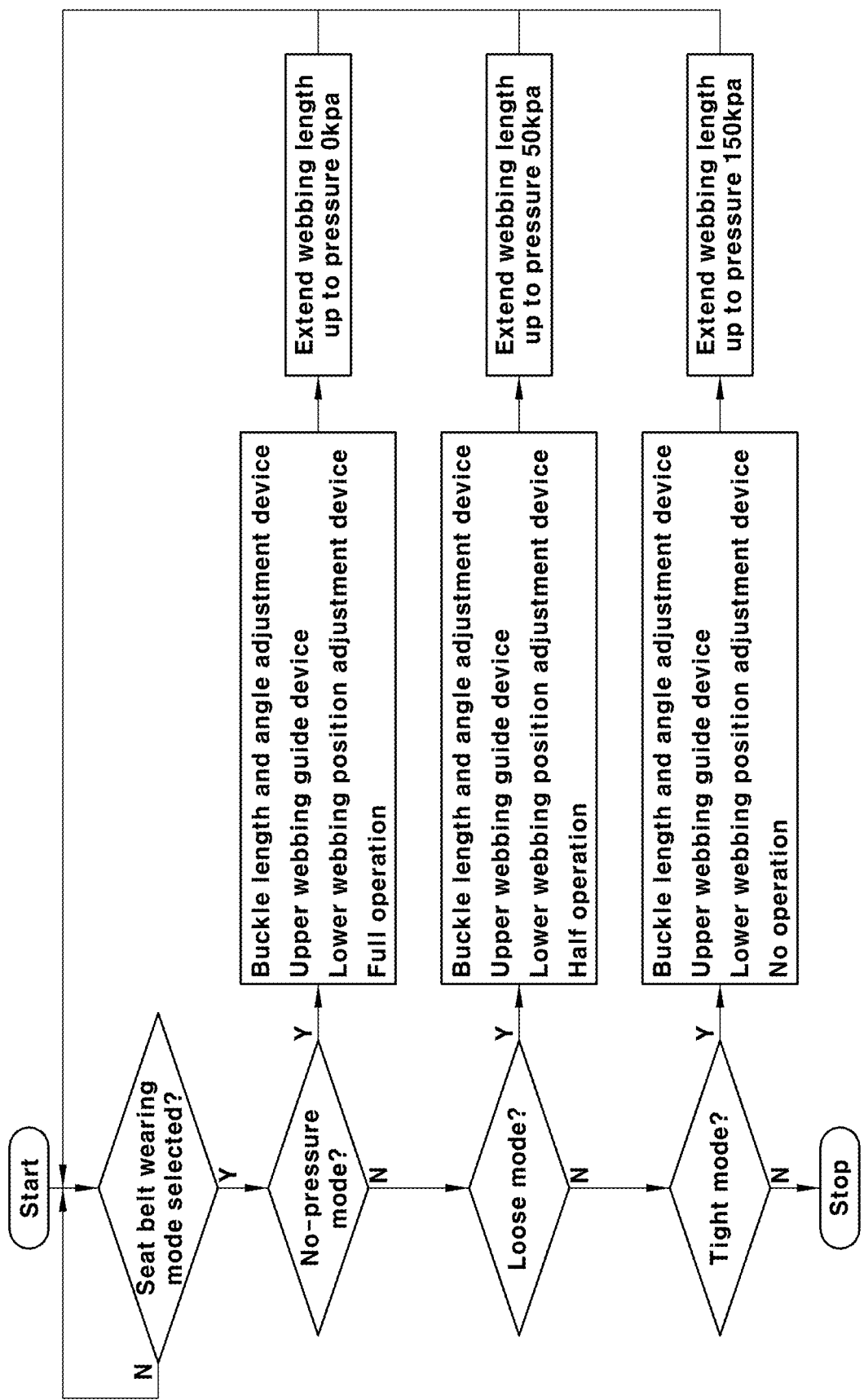
FIG. 13 is a flowchart illustrating an example of an operation according to a user setting of the system for adjusting seat belt pressure according to an embodiment of the present disclosure.

FIG. 13 is a flowchart illustrating an example of an operation according to a user setting of the system for adjusting seat belt pressure according to an embodiment of the present disclosure.

First, a passenger may directly select a seat belt wearing mode displayed in the menu of an AVN system installed in a vehicle.

In other words, a passenger may directly select one of a no-pressure mode, a loose mode, and a tight mode as the seat belt wearing mode according to his or her preference.

Accordingly, according to the seat belt wearing mode selected directly by a passenger, at least one of the plurality of webbing pressure adjustment drive devices for relieving webbing pressure may be operated by the control signal of the controller.

When the no-pressure mode is selected, the plurality of webbing pressure adjustment drive devices can be all driven at a maximum drive amount by the control signal of the controller, so a passenger does not feel any pressure from webbing.

Figure 14:
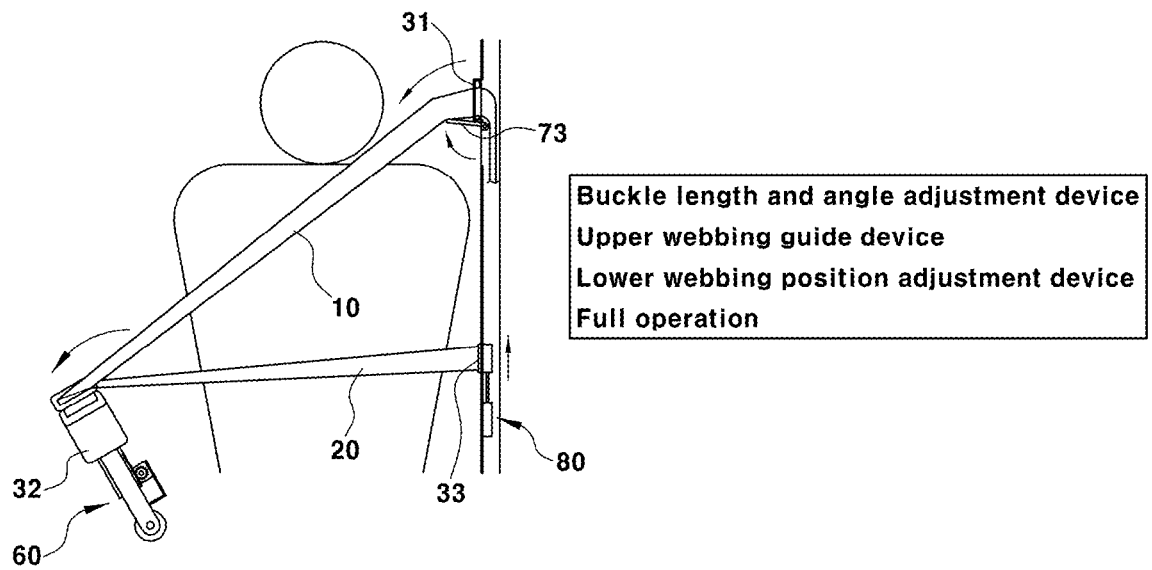
FIG. 14 is a view schematically illustrating an example of performing a webbing no-pressure mode by the system for adjusting seat belt pressure according to an embodiment of the present disclosure.

For example, as illustrated in FIG. 14, due to the drive control signal of the driving device control part 150, the buckle 32 of the buckle length and angle adjustment device 60 can be maximally rotated outward, and the webbing guide 73 of the upper webbing guide device 70 can be maximally rotated, and thus the upper webbing 10 can be maximally raised, the up/downward movement block 81 of the lower webbing position adjustment device 80 and the lower webbing fixing body 33 can be maximally raised, and the upper webbing 10 wound on the drum inside the retractor 34 can be further pulled out by a predetermined length, so a passenger may not feel any pressure from the webbing.

In this example, because the upper webbing 10 and the lower webbing 20 are within one inch from the body surface of a passenger, the passenger can be safely protected by a seat belt in the event of the sudden stop or collision of a vehicle.

When the loose mode is selected, the plurality of webbing pressure adjustment drive devices can be all driven at half a drive amount by the control signal of the controller, so a webbing pressure on a passenger can be relieved.

Figure 15:
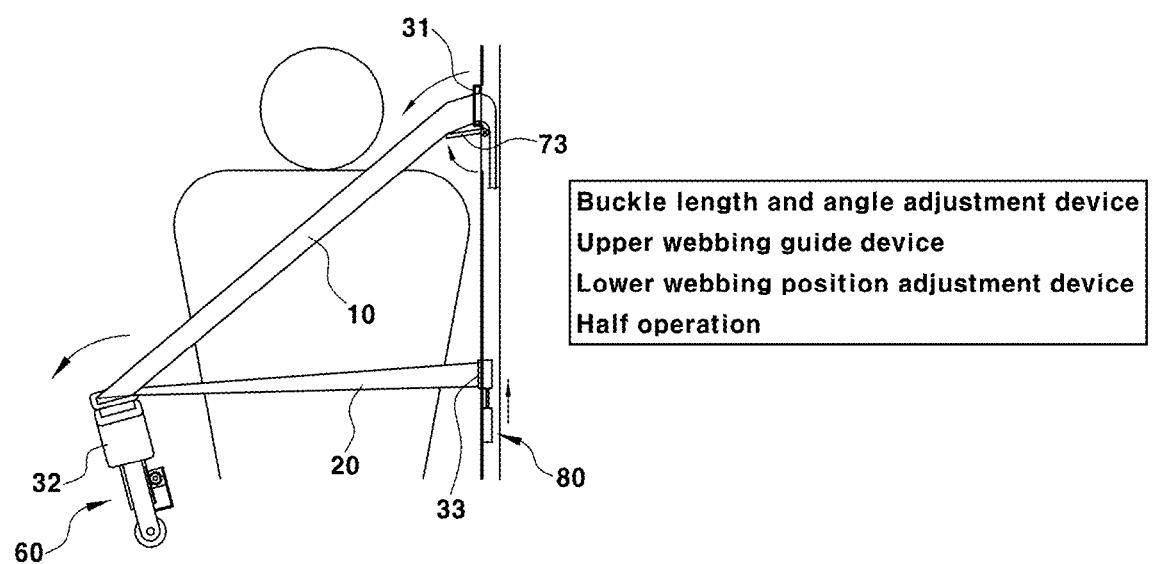
FIG. 15 is a view schematically illustrating an example of performing a webbing loose mode by the system for adjusting seat belt pressure according to an embodiment of the present disclosure.

For example, as illustrated in FIG. 15, due to the drive control signal of the driving device control part 150, the buckle 32 of the buckle length and angle adjustment device 60 can be half rotated outward and the webbing guide 73 of the upper webbing guide device 70 can be half rotated to raise the upper webbing 10, and the up/downward movement block 81 of the lower webbing position adjustment device 80 and the lower webbing fixing body 33 can be half rotated so that the upper webbing 10 wound on the drum inside the retractor 34 can be further pulled out approximately by half of a predetermined length, so a webbing pressure on a passenger can be relieved.

When the tight mode is selected, only the retractor which is one of the plurality of webbing pressure adjustment drive devices may be operated by the control signal of the controller to extend a webbing length.

Figure 16:
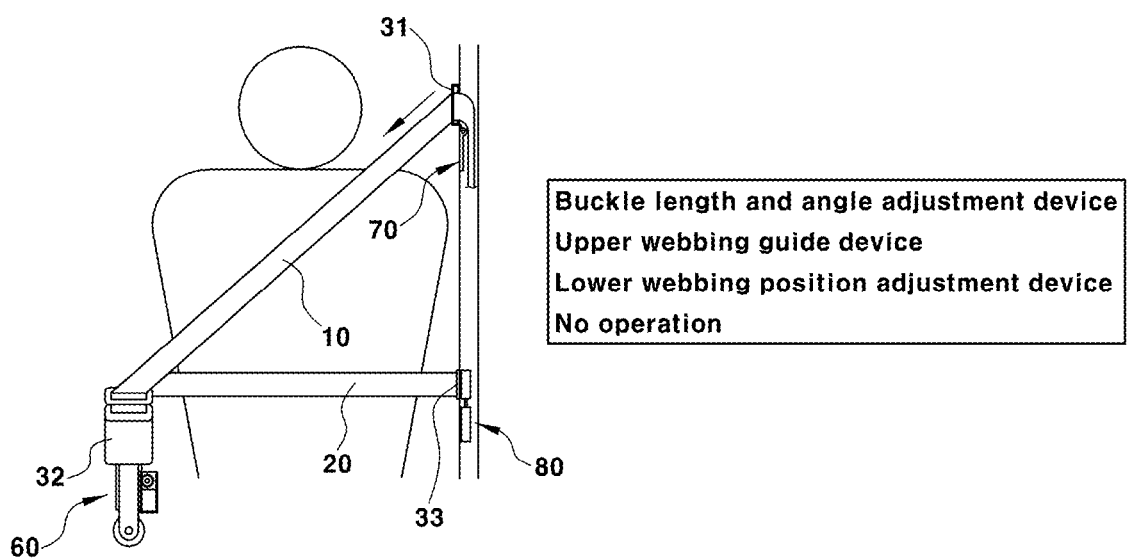
FIG. 16 is a view schematically illustrating an example of performing a webbing tight mode by the system for adjusting seat belt pressure according to an embodiment of the present disclosure.

For example, as illustrated in FIG. 16, the buckle length and angle adjustment device 60, the upper webbing guide device 70, and the lower webbing position adjustment device 80 may be not operated, and only the retractor may be driven to extend a webbing length, thereby keeping a webbing pressure on a passenger to a minimum.

In this example, a passenger can directly select one of the no-pressure mode, the loose mode, and the tight mode as the seat belt wearing mode, thereby directly adjusting seat belt pressure to a level desired by the passenger.

Although the present disclosure has been described in detail example embodiments, the scope of the claims of the present disclosure is not necessarily limited to the above-described embodiments, and various modifications and improvements of the embodiments by those skilled in the art pertaining to the present disclosure and as defined in the claims below can also be included in the scope of the claims of the present disclosure.

What is claimed is:

1. A system for adjusting seat belt pressure, the system comprising:
    multiple markers attached at regular intervals on an outer surface of each of an upper webbing and a lower webbing;
    a body pressure sensor attached on an inner surface of each of the upper webbing and the lower webbing, the body pressure sensor configured to detect a body pressure applied to a passenger's body by each of the upper webbing and the lower webbing;
    a camera configured to photograph positions of at least some of the multiple markers, an upper webbing pull-out guiding D-ring, a buckle, and a lower webbing fixing body;
    a controller configured to determine whether the body pressure at a maximum protrusion point of each of the upper webbing and the lower webbing is greater than or equal to a reference pressure based on a captured signal of the camera and a detection signal of the body pressure sensor; and
    webbing pressure adjustment drive devices configured to be driven to relieve the body pressure to be less than the reference pressure based on a control signal of the controller in response to the body pressure at the maximum protrusion point being greater than or equal to the reference pressure, wherein the webbing pressure adjustment drive devices comprise:
        a buckle length and angle adjustment device configured to perform one of or both of moving up and down the buckle, and rotating the buckle in a width direction of a vehicle body;
        an upper webbing guide device configured to raise the upper webbing pulled out from the upper webbing pull-out guiding D-ring;
        a lower webbing position adjustment device configured to move the lower webbing fixing body up and down; and
        a retractor driving device configured to further pull out webbing wound inside a retractor by a selected length.

2. The system of claim 1, wherein the controller comprises:
    a webbing shape recognition part configured to determine a shape of each of the upper webbing and the lower webbing based on the captured signal of the camera;
    a webbing maximum protrusion point determination part configured to determine the maximum protrusion point of each of the upper webbing and the lower webbing based on the shape of each of the upper webbing and the lower webbing determined in the webbing shape recognition part;
    a maximum body pressure determination part configured to determine a maximum pressure point of each of the upper webbing and the lower webbing applied to the passenger's body based on the detection signal of the body pressure sensor;
    a body pressure comparison part configured to determine whether the maximum protrusion point of each of the upper webbing and the lower webbing and the maximum pressure point of each of the upper webbing and the lower webbing correspond to each other; and
    a driving device control part configured to command a drive control signal for relieving webbing pressure to at least one of the webbing pressure adjustment drive devices in response to the maximum protrusion point of each of the upper webbing and the lower webbing and the maximum pressure point of each of the upper webbing and the lower webbing corresponding to each other.

3. The system of claim 2, wherein the webbing shape recognition part is further configured to calculate an inclination of each of the multiple markers of each of the upper webbing and the lower webbing photographed by the camera, recognize markers with inclinations greater than an inclination of 0.5 among the multiple markers as points on the upper webbing, recognize markers with inclinations smaller than the inclination of 0.5 as points on the lower webbing, and to determine longitudinal trajectory and shape of each of the upper webbing and the lower webbing by connecting each of the points.

4. The system of claim 2, wherein the webbing maximum protrusion point determination part is further configured to determine points divided into quartiles on a longitudinal trajectory of each of the upper webbing and the lower webbing determined in the webbing shape recognition part, calculate vertical distances between the points and the camera, and determine a closest point of the points having a shortest vertical distance from the camera as a webbing maximum protrusion point.

5. The system of claim 2, wherein the controller is further configured to re-determine the maximum protrusion point of each of the upper webbing and the lower webbing and the maximum pressure point of each of the upper webbing and the lower webbing by determining, as an error, a situation in which the maximum protrusion point of each of the upper webbing and the lower webbing and the maximum pressure point of each of the upper webbing and the lower webbing do not correspond to each other.

6. The system of claim 1, wherein the buckle length and angle adjustment device comprises:
- a hollow lifting bar connected to a lower side of the buckle;
- a support bar having an upper part inserted into the lifting bar and having a lower part rotatably coupled to the vehicle body;
- a first motor connected to a rotation shaft of the support bar;
- a rack formed on a side part of the lifting bar;
- a second motor mounted on a side of the support bar; and
- a pinion being connected to an output shaft of the second motor and engaged with the rack.

7. The system of claim 1, wherein the upper webbing guide device comprises:
- the upper webbing pull-out guiding D-ring mounted on a webbing entrance formed on a side panel inside a vehicle and configured such that the upper webbing pulled out from the retractor is guided in a direction of the webbing worn by the passenger;
- a second motor mounted under the webbing entrance; and
- a webbing guide connected rotatably to an output shaft of the second motor and configured to move up the upper webbing pulled out from the webbing entrance.

8. The system of claim 1, wherein the lower webbing position adjustment device comprises:
- a guide hole with a first length formed in a vertical direction on a side panel inside a vehicle;
- the lower webbing fixing body connected to an end part of the lower webbing;
- an up/downward movement block extending from a rear surface part of the lower webbing fixing body and arranged to be movable up and down inside the guide hole; and
- an actuator mounted inside the side panel, wherein a plunger of the actuator is connected to a lower side of the up/downward movement block.

9. The system of claim 1, wherein the retractor driving device comprises:
- the retractor having a drum on which webbing is wound to be pulled out; and
- a third motor mounted on a side part of the retractor, wherein an output shaft of the third motor is connected to a drum shaft of the drum.

10. A method for adjusting seat belt pressure, the method comprising:
- photographing positions of multiple markers attached on each of an upper webbing and a lower webbing, an upper webbing pull-out guiding D-ring, a buckle, and a lower webbing fixing body by using a camera;
- detecting a body pressure applied to a passenger's body by each of the upper webbing and the lower webbing by a body pressure sensor attached on an inner surface of each of the upper webbing and the lower webbing;
- determining whether the body pressure at a maximum protrusion point of each of the upper webbing and the lower webbing is greater than or equal to a reference pressure based on a captured signal of the camera and a detection signal of the body pressure sensor;
- driving at least one of webbing pressure adjustment drive devices so that the body pressure at the maximum protrusion point is relieved to be less than the reference pressure in response to the body pressure at the maximum protrusion point being greater than or equal to the reference pressure;
- recognizing a webbing shape for determining longitudinal trajectory and shape of each of the upper webbing and the lower webbing based on the captured signal of the camera;
- determining a webbing maximum protrusion point for determining the maximum protrusion point of each of the upper webbing and the lower webbing based on the longitudinal trajectory and shape of each of the upper webbing and the lower webbing determined in the recognizing of the webbing shape;
- determining a maximum body pressure for determining a maximum pressure point of each of the upper webbing and the lower webbing applied to a passenger based on the detection signal of the body pressure sensor;
- comparing body pressure for determining whether the maximum protrusion point of each of the upper webbing and the lower webbing and the maximum pressure point of each of the upper webbing and the lower webbing correspond to each other; and
- commanding a drive control signal for relieving webbing pressure to at least one of the webbing pressure adjustment drive devices in response to the maximum protrusion point of each of the upper webbing and the lower webbing and the maximum pressure point of each of the upper webbing and the lower webbing corresponding to each other.

11. The method of claim 10, wherein the recognizing of the webbing shape comprises sequentially performing:
- calculating an inclination of each of the multiple markers of each of the upper webbing and the lower webbing photographed by the camera;
- recognizing markers with inclinations greater than an inclination of 0.5 among the multiple markers as points on the upper webbing;
- recognizing markers with inclinations smaller than the inclination of 0.5 as points on the lower webbing; and
- determining the longitudinal trajectory and shape of each of the upper webbing and the lower webbing by connecting each of the points.

12. The method of claim 10, wherein determining the webbing maximum protrusion point comprises sequentially performing:
- determining points divided into quartiles on the longitudinal trajectory of each of the upper webbing and the lower webbing determined in the recognizing of the webbing shape;
- calculating vertical distances between the points and the camera; and determining a closest point of the points having a shortest vertical distance from the camera as the webbing maximum protrusion point.

13. The method of claim 10, further comprising:
re-determining the maximum protrusion point of each of the upper webbing and the lower webbing and the maximum pressure point of each of the upper webbing and the lower webbing by determining, as an error, a situation in which the maximum protrusion point of each of the upper webbing and the lower webbing and the maximum pressure point of each of the upper webbing and the lower webbing do not correspond to each other.

14. A method for adjusting seat belt pressure, the method comprising:
selecting one of a no-pressure mode, a loose mode, and a tight mode as a seat belt wearing mode; and
driving at least one of webbing pressure adjustment drive devices for relieving webbing pressure according to the selected seat belt wearing mode, wherein the webbing pressure adjustment drive devices comprise:
a buckle length and angle adjustment device configured to perform one of or both of moving up and down a buckle, and rotating the buckle in a width direction of a vehicle body;
an upper webbing guide device configured to raise the upper webbing pulled out from an upper webbing pull-out guiding D-ring;
a lower webbing position adjustment device configured to move a lower webbing fixing body up and down; and
a retractor driving device configured to further pull out webbing wound inside a retractor by a selected length.

15. The method of claim 14, wherein in response to the no-pressure mode being selected, the webbing pressure adjustment drive devices are all driven at a maximum drive amount.

16. The method of claim 14, wherein in response to the loose mode being selected, the webbing pressure adjustment drive devices are all driven at half a drive amount.

17. The method of claim 14, wherein in response to the tight mode being selected, only the retractor of the webbing pressure adjustment drive devices is operated to extend a webbing length.

18. The method of claim 14, wherein the buckle length and angle adjustment device comprises:
a hollow lifting bar connected to a lower side of the buckle;
a support bar having an upper part inserted into the lifting bar and having a lower part rotatably coupled to the vehicle body;
a first motor connected to a rotation shaft of the support bar;
a rack formed on a side part of the lifting bar;
a second motor mounted on a side of the support bar; and
a pinion being connected to an output shaft of the second motor and engaged with the rack.

19. The method of claim 14, wherein the upper webbing guide device comprises:
the upper webbing pull-out guiding D-ring mounted on a webbing entrance formed on a side panel inside a vehicle and configured such that the upper webbing pulled out from the retractor is guided in a direction of the webbing worn by a passenger;
a second motor mounted under the webbing entrance; and
a webbing guide connected rotatably to an output shaft of the second motor and configured to move up the upper webbing pulled out from the webbing entrance.

20. The method of claim 14, wherein the lower webbing position adjustment device comprises:
a guide hole with a first length formed in a vertical direction on a side panel inside a vehicle;
the lower webbing fixing body connected to an end part of the lower webbing;
an up/downward movement block extending from a rear surface part of the lower webbing fixing body and arranged to be movable up and down inside the guide hole; and
an actuator mounted inside the side panel, wherein a plunger of the actuator is connected to a lower side of the up/downward movement block.

* * * * *